US004001676B2

United States Statutory Invention Registration [19]

[11] Reg. Number: H1676

Marshall

[45] Published: Sep. 2, 1997

[54] SITE MANAGEMENT SYSTEM FOR CONTAINING HAZARDOUS SPILLS AND LEAKS

[75] Inventor: Glen Richard Marshall, Kingwood, Tex.

[73] Assignee: Shell Oil Company, Houston, Tex.

[21] Appl. No.: 622,050

[22] Filed: Mar. 26, 1996

Related U.S. Application Data

[63] Continuation of Ser. No. 206,291, Mar. 3, 1994, abandoned.

[51] Int. Cl.[6] ..... G21C 17/07

[52] U.S. Cl. ..... 340/605; 166/337; 166/250.08

[56] References Cited

U.S. PATENT DOCUMENTS

| | | | |
|---|---|---|---|
| 4,365,196 | 12/1982 | Finch | 324/207.17 |
| 4,644,354 | 2/1987 | Kidd | 340/605 |
| 4,721,950 | 1/1988 | Andrejascich et al. | 340/605 |
| 4,788,648 | 11/1988 | Ferretti et al. | 340/618 |
| 5,202,667 | 4/1993 | Alvin | 340/605 |
| 5,264,368 | 11/1993 | Clarke et al. | 340/605 |
| 5,351,037 | 9/1994 | Martell et al. | 340/605 |
| 5,400,253 | 3/1995 | O'Connor | 364/442 |

OTHER PUBLICATIONS

Electronic Tank Gauges Future Concepts.

*Primary Examiner*—Bernarr E. Gregory

[57] ABSTRACT

An improved system for monitoring fuel storage and handling equipment which employs containment devices, leak detectors, storage tank level detectors, containment shrouds surrounding each mechanical device for extraction or addition of fuel from storage tanks is presented in which non-mechanical fluid sensors provide communications of the detection of fluid to a central processor which receives all sensor communications and provides a signal of the presence of fluid from the handling and storage equipment. The improvement incorporates various incidental emissions sensors placed proximate to containment devices. The incidental emissions sensors are indirectly actuated by the detection of spills and leaks and are in communication with the central processor. The system may also incorporate fail safe self diagnostic devices and differentiating sensors. In a preferred embodiment, Hall Effect sensors are used.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SITE MANAGEMENT SYSTEM FOR CONTAINING HAZARDOUS SPILLS AND LEAKS

This is a continuation of application Ser. No. 08/206,291, filed Mar. 3, 1994, now abandoned.

FIELD OF THE INVENTION

This invention relates to the collection, detection, and reduction of leaks and spillage of hazardous materials.

BACKGROUND OF THE INVENTION

Avoiding and detecting gasoline that is leaked or spilled during the process of fueling vehicles and servicing fuel storage and handling equipment has become critically important to the operation of service stations. Left unchecked, fuel spillage could seep into the ground and contaminate groundwater. It can also volatilize and add to the presence of pollutants in the atmosphere as well as create a fire hazard. There does not appear to be any shortage of recommended approaches for dealing with these problems.

An early solution to this problem was to dig a pit or trench beneath fuel dispensers, pipes, and storage tanks and line the pits and trenches with a polymeric liner. Access ways and pipes could be placed at low points to determine whether an accumulation of fluid was present. These systems were still subject to volatilization and could also leak. Further, monitoring such a system was generally done periodically with no immediate response to a spill.

Sump boxes and other devices used for the secondary containment of piping and submersible pumps (turbines) have been in existence at least as far back as 1983. Generally, such sump boxes were placed around risers, turbines, and piping joints fixed to the turbines and elsewhere. A leak detector could be placed in such a device and wired into the service station so that the attendant would be signalled to the presence of a leak. These systems were generally nondiscriminating systems. They would sound an alarm irrespective of the liquid which would fill the box. Thus, a rise in groundwater, heavy rain, or water runoff was just as likely to sound an alarm as would leaking fuel.

U.S. Pat. Nos. 4,842,163, 4,971,225, and 5,100,024 are drawn to Gasoline Collector Pit Boxes and Submersible Unit Boxes. These patents describe containment devices that were an early response to the rising need for secondary containment strategies largely driven by regulatory schemes set forth by State and local governments. Essentially, they describe containment pans that were placed beneath dispensers or around turbines. In most embodiments, the devices had a slanted floor with a well at the low point. Spillage or leakage would thus collect in the low point. A bracket was pivotally mounted to the floor of the containment pan. A float was rigidly attached to one end of the bracket with a chain attached opposite to the float. The chain was then placed in mechanical communication with a trigger on a shear valve for shutting down the flow of fuel through the dispenser. The float rested in the low point of the containment pan. When liquid filled the low point of the pan, the float would rise, pulling on the chain and tripping the shear valve.

The combination of tripping the valve, shutting down the flow of fuel, and recognizing that this had taken place was said to result in the generation of an externally manifested signal. While other embodiments of these devices existed, they all relied upon such a mechanical action or direct physical force for the actuation of the signal and the response to that signal. For this reason and others, the devices and methods set forth in these patents left many problem unsolved. For example, the reliance on a mechanical link between the float (sensor) and the shear valve proved difficult to properly set and maintain. Furthermore, because hydrocarbons have a specific gravity that is less than that of water, it was difficult to provide a float which would work well in both hydrocarbons and water or a mixture thereof. Moreover, the only externally manifested signal provided by these devices was the recognition that a dispenser or pump was no longer operating. Clearly, there is no guarantee that such a recognition will occur in a timely manner.

Another difficulty with the systems described in these patents was that the devices used in conjunction with gasoline dispensers all had a drainage means as part of the containment pan. This drainage means drained accumulated fluids through another underground line such as the vapor recovery system common to most service stations. If one is interested in secondarily containing the system then they should also provide a system for containing the drainage means. Additionally, when the drainage means is combined with the vapor recovery system one risks returning dirty or fouled fuel and water to the fuel tank. Further still, some regulatory bodies will simply not permit such an arrangement.

Spills and leakage can also arise from heavy inadvertent contact with fuel dispensers. Typically such dispensers are large rectangular objects placed between service station driving lanes. Periodically, these dispensers will be struck by a vehicle negotiating through the lanes. Prior art methods for dealing with this problem have generally involved the placement of a shear valve between the source of the fuel (lines coming in from the storage tank) and the dispenser. When the dispenser receives a large jolt, the shear valve is tripped shutting down the flow of fuel to the dispenser. Again, there is no way to guarantee that an attendant or one responsible for maintaining the system will be alerted that this will occur. The disablement of the dispenser by mechanical means is also not as reliable or as quickly actuated as desired. An improved sensing and signalling means for such an event would add greatly to the integrity of the safety and environmental protection posture of the service station.

Those involved in formulating secondary containment strategies have not generally confronted the issue of the danger of volatilization of the fuel contained. Devices used for this purpose have generally focussed on directing spillage to a low point, a well, or other area in which accumulation of small amounts of fluids could be sensed. This allows rapid detection of fluid that is accumulating but requires some accumulation nonetheless. When this occurs, fuel can volatilize and become a much more potent fire and explosion hazard than would be the case if the fuel remained a liquid. Detection methods that do not require accumulation of fuel could help avoid this problem. Of course, where some nonhazardous fluid such as water is accumulating in the containment device one would not necessarily want to cause an alarm. Thus, an ideal system would respond immediately to the presence of fluid, would distinguish between hazardous and nonhazardous substances, and would provide an appropriate signal or response depending upon the nature of the substance and the type of response desired.

Retrofitting service stations with new electrically controlled sensors, monitors, and containment devices can be a costly and disruptive undertaking. Most service stations have concrete, cement, or asphalt accessways for the vehicles using the stations. These accessways cover the areas that contain electrical connections and many of the devices used to store fuel and get it to the dispensers. Changes requiring new electrical connections and devices could require substantial excavation, trenching, wiring, and other intrusive operations. Of course, excavated areas would also have to be resurfaced. Avoiding this type of expense and trouble in the installation of new devices and sensors would also greatly benefit this area. Many of the problems associated with secondary containment devices are solved by the introduction of new devices and methods as presented in application serial number filed on the same date as this application Ser. No. 08/206,292 filed on Mar. 3, 1994, entitled "Method and Device for Containing Fuel Spills and Leaks", by inventor Glen Marshall, which is incorporated herein by reference, now U.S. Pat. No. 5,550,532.

It will also be understood by those skilled in the art that there is a fairly heavy flow of information and many monitoring requirements associated with operating modern service stations apart from avoiding leaks and spills at the dispenser and pump. Storage tanks must also be monitored for leaks. Most modern service stations employ double wall storage tanks having an interstices between the walls. A number of different sensing technologies may be employed to monitor this interstitial space to determine whether there is leakage in the tanks. This information must be communicated when such a leak occurs.

Inventory control and other accounting and financial data is also compiled by the service station attendant. The level of the fuel in the tanks must be monitored so that inventory and supply can be controlled without interruption. As point of sale devices and microprocessors make inventory control increasingly continuous, this information multiplies. For example, it is possible to detect fuel usage, inventory, and sales by reconciling point of sale data, storage tank volume, receipts and other information. Increasingly stringent accounting control requirements require just such a reconciliation. Integrating the input from fuel storage and handling devices and other data sources could streamline this process so that most of the information required of the attendant can be obtained through one source. This would simplify service station operation, add to the safety of such operations, and improve the accuracy and reliability of this information.

Another complication brought upon by the changing face of service station operations is the nature of the response to an alarm or signal that spillage and leakage has occurred. Fewer personnel now staff service stations on a full time basis and fewer still have technical expertise. Thus, it would be beneficial if a potential environmental or safety problem could be remotely signalled to a centralized agency capable of handling solving such a problem. For example, rather than waiting for an attendant to recognize that a large spill of gasoline has occurred, having the attendant evaluate the significance of the spill, and then alerting an agency capable of solving the problem, time and undue hazard could be saved by having a signal sent directly from the system under alarm to a response agency. Such a signal might also be sent to the fire department, a central monitoring facility, and any other interested location. Of course, it would not be helpful if every time a sensor sensed anything such a response was solicited. Thus, to be meaningful, such a system should be able to differentiate among the different sources of alarm generation and the relative severity of the source. The appropriate signal should then be sent to match the type and severity of the source of the problem.

While system automation provides solutions to many of the problems noted above, human judgment should not be without recourse. If an attendant receives information, from a sensor, signal, or elsewhere that continued operation of a dispenser, pump, or other fuel handling device would create a safety or environmental hazard, that attendant should be able to remotely disable the device. Response time to such information could be greatly reduced if sensor signals and controls were all centrally located.

Statistical treatment of the information generated by remote sensing means can also add to the quality of human judgment and decision making. For example, historical data concerning times and dates of spills and differentiation of the types and quantities of liquid present in containment devices can greatly contribute to the treatment of various problems. Perhaps fixtures used in association with dispensers are tightly sealed at relatively high temperatures but become loose and leaky at lower temperatures. Alternatively, containment devices may fill with fluid more readily when humid air is rapidly cooled and water vapors are thereby condensed. Distinguishing occurrences such as these from mechanical failures and other mishaps could greatly aid in identifying and using the appropriate equipment for the given conditions. Accordingly, it would be beneficial if a system could be developed which avoided the problems outlined above and compiled and processed data gathered through the operation of the system.

SUMMARY OF THE INVENTION

It is an object of this invention to provide an improved integrated system for containing leaks and spills in fuel handling and storage equipment wherein signals of spills, leaks, and impacts of such equipment are marshalled at a remote location, an appropriate response is automatically undertaken or the need for one is remotely communicated, human judgment may be used to take similar action, and analysis of such events is continuous and processed on site.

It is a further object of this invention to provide an improved integrated system for containing leaks and spills which does not require substantial excavation and reworking of service station facilities.

It is a yet further object of this invention to provide an improved integrated system for containing leaks and spills which differentiates the type and severity of a spill or leakage, is self diagnostic, and communicates this information or automatically generates a response accordingly.

In accordance with these and other objects of this invention, a system for monitoring fuel storage and handling equipment is provided in which one or more containment devices as described above are integrated in nonmechanical communication with leak and level detection sensors used in conjunction with monitoring fuel storage tanks, and leak and spill detection means employed in shrouds surrounding mechanical devices such as pumps associated with storage tanks. Signals from each sensor are communicated to a remote signalling means which may be further remoted to an off-site location. Data as set forth above is captured and processed through at least one central processor. Accounting, financial, inventory, and other data may also be processed through the central processor. The fuel handling system can also be disabled at any point indicative of a failure, spillage, or leak. Disablement can be automatic in response to a programmed function of one or more microprocessors or it can be generated remotely by a human in response to a signal generated by the system.

DETAILED DESCRIPTION OF THE INVENTION

Figure 1:
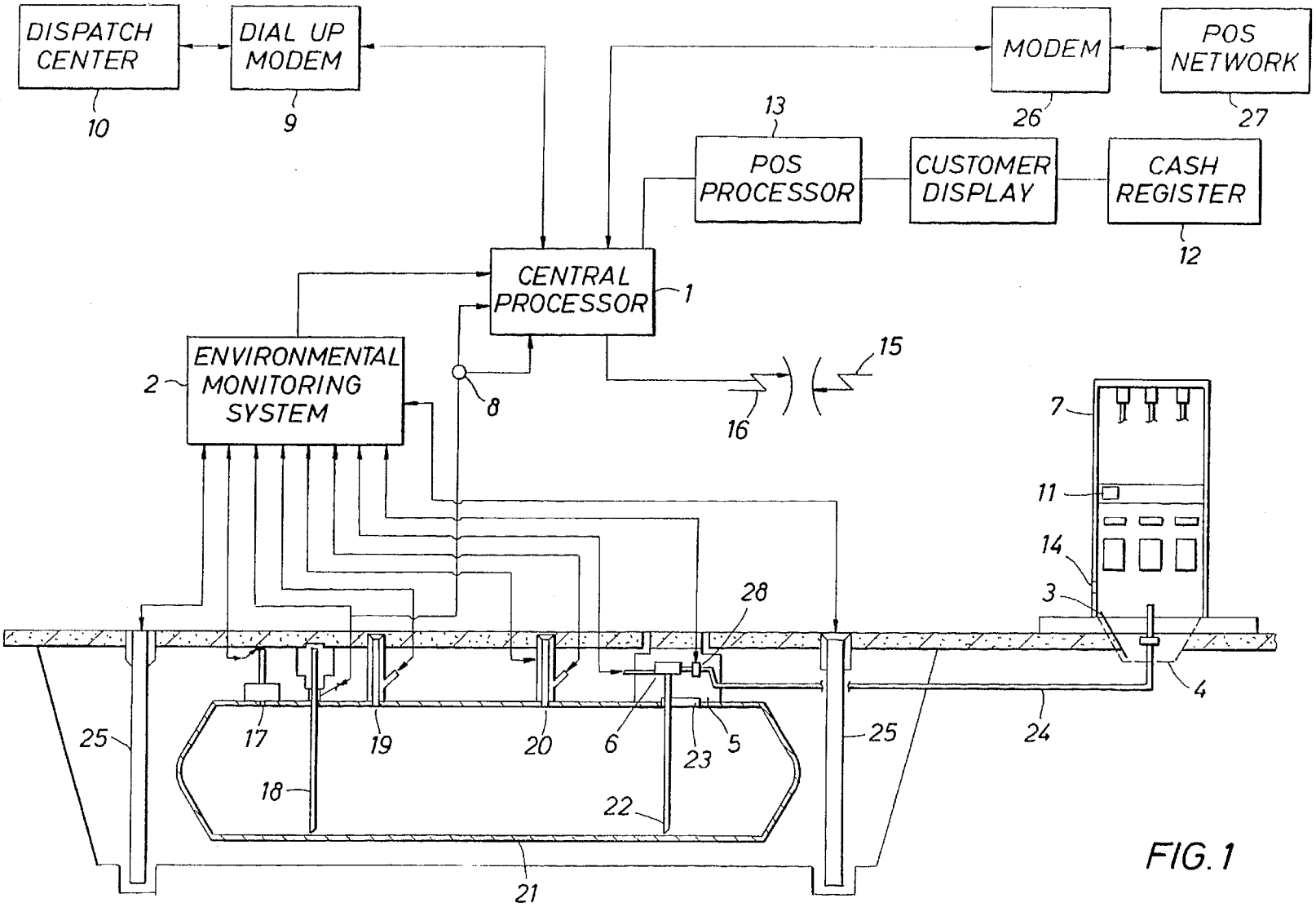
FIG. 1 is a schematic diagram showing an embodiment of an improved site management system at a service station.

The instant invention comprises a system of novel containment devices and methods that distinguish among the source, nature, and severity of a leak or spill of fuel and other fluids, provides an appropriate response or signal locally or remotely, compiles historical and analytical data relative to such events, and integrates all of these functions with other service station operations such as inventory control.

FIG. 1 is a schematic diagram of an integrated system of the instant invention incorporating the use of remote processing and control means. This embodiment of the invention consists of a central processor, 1 which receives signals from a variety of locations. Such a processor is in communication with any number of other information processing devices. In a preferred embodiment, an environmental monitoring system, 2 is in communication with sensing and signalling means placed in containment vessels and devices collocated with dispensers, pipe joints and junctions, submersible pumps (turbines), risers, fuel tanks, fill tubes/devices, and other areas which are susceptible to leaks and spills and must therefore be maintained. This includes, but is not limited to, tank hydrostatic sensors, 17; tank fill sensors, 18; sensors which monitor the stage I vapor recovery system, 19; electronic tank gauge sensors, 20; tank sensors, 21; submerged turbine sensors, 22; product line sensors, 28; sensors for monitoring tank vent and stage II vapor recovery, 23; and sensors that can monitor observation wells, 25. Product piping, 24 is monitored by positioning it to slope back toward turbine, 22. In this way, leaking product follows the course of the pipe back to the sensor used to detect turbine leaks. The environmental monitoring system, 2 communicates processed signals to the central processor, 1.

In this preferred embodiment, both the central processor, 1 and the environmental monitoring system, 2 comprise one or more microprocessors and the means of communication is by electric signal. As will be shown below, the communication between dispenser sensing means, 3 and at least one processor can be remote. That is, the communication can be by a means other than a direct one such as through electrical wiring. This is also true of other sensing means used in this system but is most desirable with respect to the dispenser sensing means, 3.

One skilled in the art will appreciate that microprocessors employed in this system can be "hard wired" (i.e., have its circuitry specifically configured) to receive such signals and respond in a discrete predetermined manner. Alternatively, the microprocessor involved can be programmable. This will be helpful when, for example, a particular sensor is known to give a false alarm under a particular set of conditions such as when atmospheric temperatures are below a certain threshold. The microprocessor can be programmed to validate a particular signal and be more sensitive to another redundant sensor which is not unduly sensitive.

The central processor, 1 of this system can be arranged so that it merely provides a signal that is readable, audible, or otherwise only communicated to an attendant. Preferably the processor will automatically induce a response. For example, if a sensor in a containment vessel, 4 beneath a dispenser detected hydrocarbon the signal can be communicated to the processor which can be set to electrically disable the dispenser under the alarm. An intersticial fuel tank monitor, 5 may induce turbines, 6 to pump fuel from the leaking pump into a tank or tanks capable of receiving the excess. Any number of possible responses can be so programmed. For example, if a sensing means is used which can determine the quantity of fuel that is leaking, an unduly high level of leakage my be programmed to invoke shutting down multiple dispensers, 7, turbines, 6, or other components.

The central processor, 1 of the preferred embodiment is also programmed to conduct a self diagnosis of the sensing means and system components. For example, a modulated pulse of electricity can be periodically generated to the processor from a given sensor such as a line monitoring sensor, 8. The processor is programmed to consider receipt of such a signal as meaning that the sensor is properly functioning. If the processor does not receive such a signal in a predetermined period of time it will sound an alarm and/or shut down the device it is monitoring. Such an event may occur when, for example, a line has been cut or short circuited. This type of monitoring is referred to as fail-safe monitoring. One skilled in the art will readily appreciate that it is possible to modulate the signal from the sensor in response to a wide range of conditions. A processor programmed to interpret those signals can then diagnose the system. This can include the diagnosis of the system for functions such as operational/nonoperational status of sensors, system sensitivity, interference from background noise, remaining useful life of a given component, likelihood of a false alarm, and other information regarding the efficacy and efficiency of the system.

A preferred response of this invention is the concomitant disablement of the component in alarm along with the signalling of the event to the service station attendant. Disablement is best conducted with a disabling means tailored to the component in question. In the case of dispensers this is best accomplished by disconnecting electrical power to the dispenser in alarm. Other suitable and available means for accomplishing this are also possible. In any case, disablement and signalling should be in response to either or both of the signals generated directly from the sensor that monitors the device and from the central processor/controller, 1.

In a most preferred embodiment of the integrated system of this invention, the processor has multiple communication nodes. One such node is the response that is communicated back to the system being monitored. Another is the signal generated locally to an attendant or other person who is nearby. Still another node is directed to a central monitoring point where the data can be constantly observed, recorded, and can invoke a remote response. For example, the central monitoring point may be in communication with an environmental spill team. When an extraordinary level of spillage or leakage is detected it is nearly instantaneously communicated to the center which then dispatches the team. This will readily contribute to the mitigation of environmental mishaps. It will be readily appreciated that such a remote communication node such as by telephonic data line can be directed anywhere that is capable of receiving such a signal. This includes, for example, direct communication to a fire department that a dispenser has been struck by a vehicle and my be spewing gasoline. Dial-up modem, 9 provides a suitable means for communication between the service station and a dispatch center, 10.

Another important function fulfilled by the processor is that of analysis and treatment of the data that is received. Modern microprocessors can rapidly collect, store, and process huge volumes of data. Regression analyses and other statistical treatment can be readily applied to signals from sensors so that problems can be more readily identified and addressed. Further, collection of this data may provide a historical record that could prove useful in any number of applications such as the selection of devices and products based upon the track record experienced with similar designs.

The central processor, 1 of the instant invention is preferably integrated with other information processing means associated with service station operations. Point of sale data generated by customer operated credit card devices, 11 affixed to dispensers and data generated by electronic cash registers, 12 can be automatically received by a POS (point of sale) processor, 13. Fuel flow data can be periodically collected at the pump and elsewhere and input into the processor by an attendant or it can be electrically transmitted directly from the dispenser to the processor. The same is true of tank levels; periodic measurements or continuous remote level monitoring can be manually or automatically input into the processor. It will be readily appreciated by those skilled in the art that modern microprocessors can easily use such data to produce accounting records, inventory control information, and other information related to the financial and operational aspects of the service station. When data concerning the source and nature of spills and leaks mentioned above is integrated into such techniques a powerful analytical tool is produced. For example, the processor may show that customers prefer to use particular dispensers (perhaps because of their location). A leak is detected from a dispenser and turbine located elsewhere. By analyzing the usage of fuel associated with the leaking dispenser, the risk of further leaks, and the extent of the leaks detected, a financial determination may be better reached regarding whether the dispenser should be fixed or merely disabled. The system of the instant invention can also be linked with other networks to make use of the information that such a network may provide or to contribute to it. This is done, for example, through modem, 26 to achieve communications with, for example, POS network, 27.

The system of the instant invention employs the containment vessels described and claimed in application Ser. No. 08/206,292 filed on the same date as this application, entitled "Method and Device for Containing Fuel Spills and Leaks", by inventor Glen Marshall. These containment vessels contain leaks, spills, and other fluids emanating from dispensers and other fuel handling equipment they are placed beneath or in concert with. The containment vessels used in this system are "smart" systems. That is, they have sophisticated differentiating sensing means which are used as components in such vessels and, in preferred embodiment, are actually an intrinsic element of the vessel construction itself.

Past containment vessels have emphasized that the bottom or floor should slope to a low point or well so that a sensor placed therein could detect fluid accumulations more rapidly. While such a design can still be employed in the vessels of this invention, it is not required. A preferred containment vessel appears generally as a three dimensional trapezoid having its major leg on top (towards the surface). The top of the vessel is open so that fluid may enter the vessel but the remainder of vessel is substantially encased/enclosed. Construction may be of any material that is impermeable to hydrocarbons. This may include steel, sheet metal, high density polyethylene and other well known polymers.

Another preferred containment vessel has a generally rounded concave interior portion directed away from the device producing the spills or leaks. This may be accomplished through proper molding of the vessel or may accomplished by means of an insert placed in the interior of the vessel. It is possible to have the containment vessel itself shaped substantially as a hemisphere. This is not preferred since the trapezoidal shape described above allows the vessel to be easily emplaced and removed from beneath the concrete islands in which they are generally mounted. An accessway is provided to the vessel so that if fluid accumulates in it, the vessel may be emptied by a thief pump or other device. In another embodiment of the invention, the vessel itself is entirely removable so that maintenance personnel can simply lift out the vessel and pour out its contents into a disposal vessel.

At least one differentiating sensing means for detecting the presence of fluids is placed within the containment vessel. These sensing means may use any number of technologies to detect and signal the presence of such fluids provided they are not mechanically actuated. As used throughout this specification, mechanical actuation of sensors means that a physical and mechanical action of the substance to be sensed is directly transduced into a signal by a mechanical action of the sensor. Thus, the sensing means herein referenced either do not rely upon physical and mechanical actions of the substance or do not directly transduce a signal by a mechanical action of the sensor in response to such an action.

Sensing means which may be used in this invention include without limitation: capacitance sensors, conductivity sensors, sensors that employ a remote nonmechanical signal in response to a rise in fluid level such as through magnetic effect (e.g., the Hall Effect), optical and electro-optical sensors, chemical sensors, infrared emitter/receivers, radio frequency transmitter/receivers, electrical imposition and detection of a modulated signal on existing signals (e.g., on electrical lines), ultrasonic sensors, and other nonmechanically actuated sensors.

Differentiating sensing means are used to distinguish or determine the types of substances entering the containment vessel. This is best explained by way of example. Such a sensing means actually may incorporate a multiplicity of sensing elements. One may be a conductivity based sensor coated in a hydrocarbon permeable substance such as a polydimethylsiloxane derivative. When a hydrocarbon permeates the coating, electrical current flowing through the sensing element is altered and a signal is actuated. Of course, since water is a nonhydrocarbon it will have no such effect. Thus, if groundwater enters the vessel but no leakage of fuel accompanies it, no signal is generated.

Still, it is desirable to detect the presence of water so that when the vessel is filled the containment strategy is not then defeated by fuel overflowing from a filled vessel. This may be accomplished by employing a sensing means specific to nonhydrocarbons such as water. Such a device may be mechanically or nonmechanically actuated provided it does not detect hydrocarbons. One way of accomplishing this is through the use of a float device which will float only under a specific gravity not found in hydrocarbons (e.g., a specific gravity of 62.4 $lb/ft^3$, the specific gravity of water). It will be recognized that fluids in which such a sensor float will be at a higher level than is the float if they have a specific gravity less than the one chosen. A signal is generated when the float reaches a height that is indicative of nearly filling the containment vessel. This can be adjustable depending upon the desire of the service station supervisor. It will also be appreciated that the specific gravity of gasoline is actually a range of specific gravities. One skilled in the art will select the proper float to differentiate the presence of hydrocarbon from nonhydrocarbon and the level of nonhydrocarbon if this method is selected.

In another preferred containment device, a sensor is used which can chemically, optically, or electronically determine and distinguish the type and quantity of substance entering the vessel. One means which can accomplish this is a sensor which incorporates a wave guide or fiber optic component. Such a component is positioned in the vessel so that it will contact the fluid entering the vessel at its sensing element. Light enters the component and is reflected against a surface in communication with a means for receiving and communicating the signal it is receiving. When a substance enters the vessel it scatters or interferes with the optical signal transmitted through the fiber. A simple optical sensing means will simply distinguish signal from nonsignal/interference and transduce a response to such a detection. However, preferred sensing means will detect the amount and type of scattering or interference and transmit this information back to a microprocessor. This signal will then be used to determine the nature of the substance present, its physical state, and how much is present. Those skilled in the art will appreciate that this can be done with any number of analytical techniques such as solutions of the Rayleigh Equation and derivations thereof.

In a most preferred containment device, the containment vessel incorporates one or more differentiating sensing means as an intrinsic portion of its construction. One such example is a vessel constructed of molded thermoplastic being laced with a conductivity or capacitance based sensing means and coated with a layer of hydrocarbon permeable material. Leads are run into each of two layers of conductive material for transmitting a charge onto each layer. A dielectric lies between the layers. No current can pass through the dielectric. However, when hydrocarbons pass through the permeable material they displace the dielectric. The layers are supplied with a charge that can overcome the dielectric of hydrocarbons in fuel and so a small current passes from one layer to another thereby completing a circuit. The detection of this circuit is made with a voltmeter, ammeter, or other suitable device and thus the containment vessel is itself the sensing means.

The system of the instant invention allows relatively easy and inexpensive retrofits of existing service stations. Excessive conduits and wires that run through those conduits do not need to be employed with many of the sensing means of this system. Integrating the signals of such a system merely requires capturing the incidental emissions of the sensor system employed or the containment device monitored. This is most easily done by capitalizing on the Hall Effect (the induced magnetic field associated with electrical circuits). However, it should be noted that any emission that is incidental to the operation of a sensing means can serve this purpose. Other such emissions include, without limitation, vibrational and sonic effects. These incidental emission sensing means are placed proximate to the containment device or sensing means to be monitored. As used throughout this specification, proximate means a distance at which the incidental emission to be sensed is of a sufficient intensity or strength to be detected by the incidental emission sensing means used.

The use of Hall Effect signalling to remotely communicate is particularly applicable in the case of monitoring fuel dispensers. Most dispensers require some current to operate. At a minimum, electricity is needed to light up LEDs and operate the internal circuitry. Dispenser containment vessels can be retrofitted beneath the surface with the containment devices described above.

When the sensing means of the containment device detects a nonhydrocarbon liquid, a low voltage, intrinsically safe DC current is generated in a potted electronic circuit box. A different voltage current is generated in response to the detection of a hydrocarbon. A Hall Effect Sensor, 14 located nearby detects the magnetic field associated with the generation of the electric field, distinguishes the field strength or the modulation thereof, and communicates this information to the central processor, 1. Communication is preferably wireless as where the Hall Effect emitter, 15 sends a signal to the Hall Effect receiver, 16 by means of an infrared signal, radio signal, modulated laser signal, sonic signal, microwave signal, magnetic signal or other remote means of communication. Any incidental emission sensing means can have an incidental emission sensing means emitter so constructed. The processor in such a case will have a corresponding incidental emission sensing means receiver.

In a most preferred embodiment, a Hall Effect emitter modulates another existing communication line directed to the central processor. This is done by superimposing a sinusoidal signal on an existing ground or neutral wire that already runs between other equipment and the facility in which the central processor is housed. The existing line that is so modulated can then be linked to the central processor. It is preferred that the existing line also contain a filtering circuit to avoid data corruption.

Central processor, 1 is programmed to produce a different response and signal for different field strength signals and the modulations associated with them. Thus, for example, an alarm signal can be generated for the detection of a low level of water but both an additional alarm and disablement of the dispenser can be induced from the detection of any hydrocarbon or a high level of water.

Another aspect of the integrated approach of this invention is the ability to include any number of additional remote sensing means. One example of such a desirable sensing means is a vehicular impact sensor. This sensing means is used to detect an incident in which any dispenser or suction pump is struck by a vehicle. Preferably, this sensing means is sensitive primarily to force applied in one direction. For example, if the sensing means is mounted vertically, it should be very sensitive to vertical movement but relatively insensitive to horizontal movement. This helps reduce false alarms from vibrations, inadvertent nudges, and the like. The sensing means is ordinarily mounted directly to the dispenser and indeed is mounted to be sensitive to vertical movement since this is the expected type of movement in a vehicular collision with the dispenser. A concern here is that residual capacitance not be allowed to generate a spark that can ignite any spilled fuel that may now he accessible. This can he avoided by extending a coil of ground wire from the pump. The coil is sufficiently wound and of sufficient length so that the charge on the dispenser is fully dissipated before it can be fully extended and breaks.

Conventional accelerometers can he used as vehicular impact sensing means. These devices detect motion primarily in one direction and are small enough to be integrated into the system herein claimed and described. Thus, for example, the generation of a signal or the cessation of a signal can he detected by a Hall Effect sensor which communicates the corresponding signal to the central processor so that the dispenser is disabled and an attendant and/or other person is alerted.

While the remoting aspects, automatic control, and automatic response of this system are very important, so too is the ability to interject human judgment to correct, supplant, or override some aspects of the system. To accommodate this function, the control of the system can be selectively overridden. For example, it may be desirable to disable a dispenser despite the fact that no spilled product or impact has been sensed. An attendant would pass a signal to the processor which is conmmunicated to the dispenser commanding it to become disabled.

Construction and fabrication methods that are used in this invention include the use of solid state components for all sensing means so that ignition sparks are avoided. This can easily be achieved by using intrinsically safe components and methods as set forth in the National Electrical Code per NFPA-70.

I claim as my invention:

1. In a system for monitoring fuel storage and handling equipment comprising a plurality of containment devices, leak detectors, storage tank level detectors, containment shrouds substantially surrounding each mechanical device for extraction or addtion of fuel from storage tanks, said shroud having fluid sensors providing communications of the detection of fluid in said shroud, and a central processor, said processor receiving all sensor communications and point of sale data originating from a point of sale processor, said processor providing a signal of the presence of fluid from said handling and storage equipment, the improvement comprising:

a fail-safe monitoring means in communication with said central processor wherein said processor integrates point of sale data and accounting data with sensor communications.

* * * * *